US008736418B2

(12) United States Patent
Bozionek et al.

(10) Patent No.: US 8,736,418 B2
(45) Date of Patent: May 27, 2014

(54) METHOD AND CENTRAL DEVICE FOR CONTROLLING ACCESS TO SECURE AREAS OR DEVICES

(75) Inventors: Bruno Bozionek, Borchen (DE); Dieter Klaus, Delbrück (DE); Jürgen Luers, Borchen (DE); Hubert Niemeier, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 1081 days.

(21) Appl. No.: 12/085,759

(22) PCT Filed: Nov. 8, 2006

(86) PCT No.: PCT/EP2006/068224
§ 371 (c)(1), (2), (4) Date: May 30, 2008

(87) PCT Pub. No.: WO2007/062965
PCT Pub. Date: Jun. 7, 2007

(65) Prior Publication Data

US 2009/0027159 A1 Jan. 29, 2009

(30) Foreign Application Priority Data

Nov. 30, 2005 (DE) ......................... 10 2005 057 101

(51) Int. Cl.
*G05B 19/00* (2006.01)

(52) U.S. Cl.
USPC .......... 340/5.2; 340/5.61; 340/5.7; 455/456.6

(58) Field of Classification Search
USPC .................. 340/539.13, 539.16, 539.12, 8.1, 340/5.5–5.7, 5.61, 5.27, 5.2; 455/456
See application file for complete search history.

(56) References Cited

U.S. PATENT DOCUMENTS

| | | | | |
|---|---|---|---|---|
| 6,370,629 | B1 * | 4/2002 | Hastings et al. | 711/163 |
| 2002/0070273 | A1 | 6/2002 | Fujll | |
| 2002/0119788 | A1 * | 8/2002 | Parupudi et al. | 455/456 |
| 2002/0154777 | A1 * | 10/2002 | Candelore | 380/258 |

(Continued)

FOREIGN PATENT DOCUMENTS

| | | | |
|---|---|---|---|
| EP | 1 469 368 | A1 | 10/2004 |
| EP | 1 624 416 | A2 | 2/2006 |
| WO | 01/99378 | A1 | 12/2001 |
| WO | 2004/077848 | A2 | 9/2004 |

OTHER PUBLICATIONS

International Search Report for Application No. PCT/EP2006/068224; mailed Feb. 1, 2007.

*Primary Examiner* — Daniel Wu
*Assistant Examiner* — Frederick Ott
(74) *Attorney, Agent, or Firm* — Staas & Halsey LLP

(57) ABSTRACT

A mobile device which is assigned to a person transmits an identification to a central device where localization of the mobile device is initiated. After the mobile device has been located in an area of an access system, the identification is checked for authorization for access via the access system. Access via the access system is either allowed or denied based on the result of the check. Access by an authorized person to secure areas or devices with the aid of a wireless device which is usually carried along—for example a mobile radio terminal or a DECT terminal—thus becomes considerably easier and more convenient.

13 Claims, 1 Drawing Sheet

(56) References Cited

U.S. PATENT DOCUMENTS

2002/0186121 A1 12/2002 Yoshikawa et al.
2003/0152231 A1 8/2003 Tomita et al.
2004/0163073 A1* 8/2004 Krzyzanowski et al. ..... 717/107
2004/0203748 A1* 10/2004 Kappes et al. ............. 455/432.1
2005/0061179 A1 3/2005 Seidlein
2005/0260973 A1* 11/2005 van de Groenendaal ..... 455/411
2006/0261940 A1* 11/2006 Defant et al. ............ 340/539.13
2007/0093237 A1* 4/2007 Bayne ........................ 455/414.2

* cited by examiner

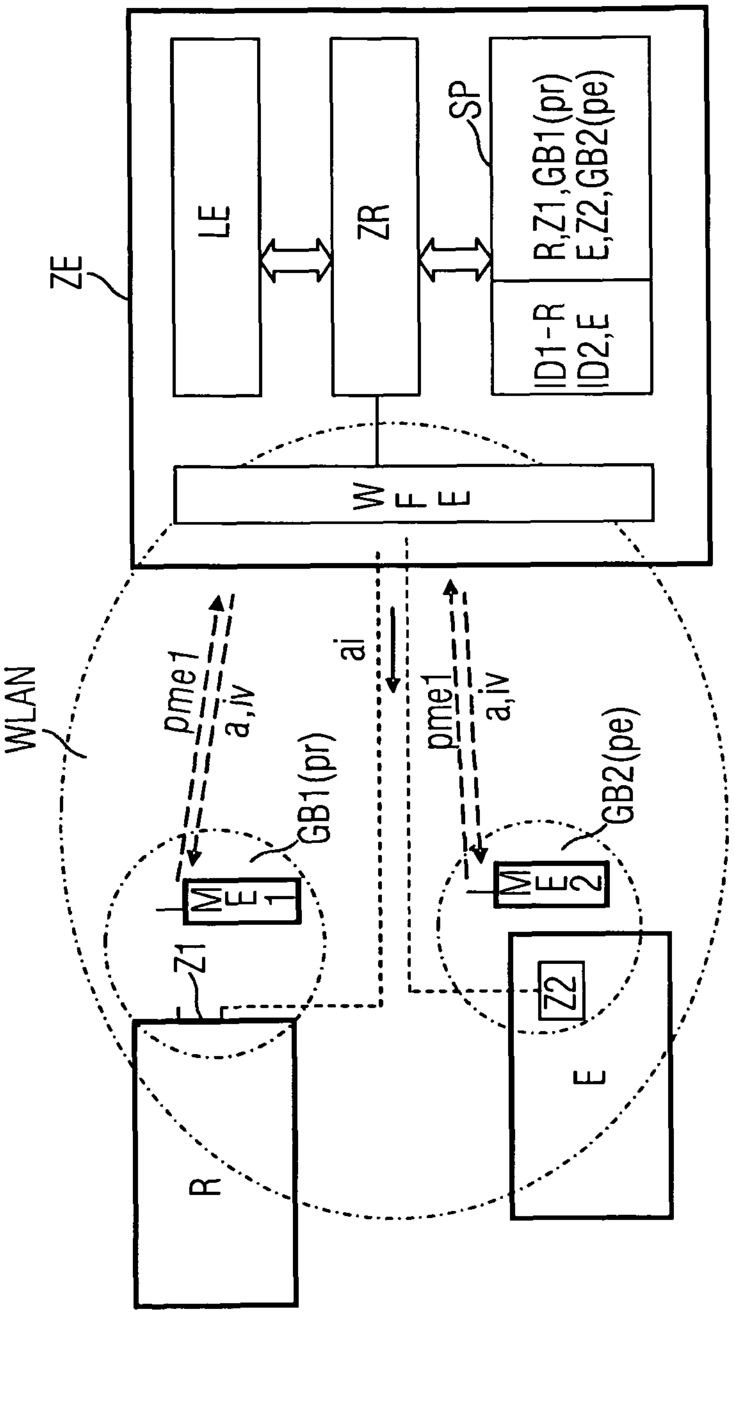
ZE
LE
ZR
SP
R,Z1,GB1(pr)
E,Z2,GB2(pe)
ID1-R
ID2,E
WFE
WLAN
pme1
a,iv
ai
pme1
a,iv
GB1(pr)
GB2(pe)
ME1
ME2
Z1
Z2
R
E

METHOD AND CENTRAL DEVICE FOR CONTROLLING ACCESS TO SECURE AREAS OR DEVICES

CROSS REFERENCE TO RELATED APPLICATIONS

This application is based on and hereby claims priority to German Application No. 10 2005 057 101.8 filed on Nov. 30, 2005, the contents of which are hereby incorporated by reference.

BACKGROUND

Access controls are provided on company premises or within a campus environment for security reasons. These access controls are carried out in each case at those points which lead to a secure area or a secure installation. For this purpose it is necessary to install centralized control components which interwork with decentralized control structures.

A representative example of a decentralized access control device is a card reader by which the code of a card introduced into the reader can be read. Once read, the code is usually transmitted to a control center by the card reader. In the control center, the code is checked in respect of its validity for accessing a secure or protected area and if it is verified as being valid, information is transmitted to an opening system. The transmitted information causes the opening system, e.g. a door opener, to be activated and e.g. a person is then able to enter the protected zone. Access controls of this kind are necessary at every access point or access area such as, for example, at every door or barrier or elevator which leads to an area that requires protecting or securing. This means that a fresh access check has to be performed at each of these locations or areas by, for example, a user ID card with access code and card reader.

SUMMARY

An aspect is to improve access to protected or secure areas for the user.

A significant advantage is to be seen in the fact that access by an authorized person to secure areas or installations is easily and conveniently possible with the aid of a wireless device usually carried on the person—a mobile radio terminal or a DECT terminal for example—without special additional authorization means such as, for example, cards and card readers.

BRIEF DESCRIPTION OF THE DRAWING

These and other aspects and advantages will become more apparent and more readily appreciated from the following description of the exemplary embodiments, taken in conjunction with the accompanying drawing of which:

The single drawing is a block diagram of a secure room and a wireless network.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The FIGURE shows a secure room R and a secure installation E, the room R being secured by way of a first secure door and the installation E by a locking device. The installation E can be, for example, a machine which may only be operated by authorized personnel. The secure door can be opened by way of a first access system Z1 which is embodied as a door opener and controlled by a central device ZE either via a wired connection or via a Wireless connection—indicated in the FIGURE by dashed lines. The locking device likewise controlled by the central device ZE represents the second access system Z2, with only authorized persons being allowed to operate the installation E by the second access system Z2.

Each of the authorized persons is equipped with a mobile device ME by which it is possible to establish a communication link to the central device ZE via a wireless network WLAN embodied as a wireless local area network. The wireless network WLAN can also be implemented as, for example, a DECT network or as a mobile radio network, with the mobile devices ME being embodied in accordance with the respective wireless network as, for example, a mobile radio terminal or DECT terminal. A WLAN radio unit WFE is provided in the central device ZE for the purpose of connecting to the wireless network WLAN, the radio unit serving to transfer information requiring to be transmitted from and to the mobile devices ME.

For the exemplary embodiment let it be assumed that the locations, i.e. the geographical positions, of the first and second access system Z1,Z2 are known and that these positions are stored by position information pr,pe together with information about the room R and the installation E in a memory SP of the central device ZE. The position information pr,pe can also define a first and second geographical area GB1,GB2 in which the first and second access system Z1,Z2 are disposed—indicated in the FIGURE by a dash-dotted circle labeled GB1 and GB2 respectively—, in which case then the first and second geographical area GB1,GB2 are stored in the memory SP of the central device ZE in addition to or instead of the position information pr,pe.

Also provided in the central device ZE is a localization device LE by which at least the localization (i.e. position determination) of the active mobile devices ME situated in the wireless network WLAN can be initiated. The initiation can consist in transmitting a request to the wireless network WLAN (not shown) to determine the position or the geographical area of a mobile device ME using network-internal methods. Network-internal position-determining or area-determining methods of this kind are known in particular from the mobile radio networks such as, for example, GSM, UMTS or DECT networks. The determined position or geographical area at which the mobile device ME concerned is currently located is reported by position information transmitted from the wireless network WLAN to the central device ZE.

Alternatively, the position or the geographical area of the mobile device ME can be determined by a GPS function (not shown) in the mobile device ME either continuously or following a request a by the central device ZE. Following a request a by the central device ZE, the current position or geographical area of the mobile device ME can be determined with the aid of the GPS function and position information pme formed can be transmitted via the wireless network WLAN to the central device ZE.

For the exemplary embodiment let it be assumed that the person assigned to a first mobile device ME1 is authorized to enter the secure room R and the person assigned to a second mobile device ME2 is authorized to operate the installation E. This assignment is indicated in that a first identification ID1 is assigned to the first mobile device ME1 and a second identification ID2 is assigned to the second mobile device ME2 and in the memory SP of the central device ZE the first identification ID1 is assigned to the information relating to the room R and the second identification ID2 is assigned to the information relating to the installation E.

For the exemplary embodiment let it be assumed that the authorized person would like to go to or enter the room R with the aid of the first mobile device ME1 via the first access system Z1. For this purpose the authorized person or, more specifically, the first mobile device ME1 moves into the first geographical area GB1 or, as the case may be, into the vicinity of the first access system Z1. There, a communication link is established with the aid of the first mobile device ME1 via the wireless network WLAN to the central device ZE and the assigned first identification ID1 is transmitted in the process. The first identification ID1 can be, for example, the address or the telephone number of the first mobile device ME1 of the wireless network WLAN or a special service address or service number by which a special service—an access service for example—is requested in the central device ZE. In the central device ZE, the access service is implemented for example by an access routine ZR.

First, the localization of the first mobile device ME1 is initiated with the aid of the access routine ZR embodied by programming means. This is effected according to the exemplary embodiment in that a request a is transmitted by the central device ZE via the wireless network WLAN to the first mobile device ME1. After the request a is received in the first mobile device ME1, the GPS function is activated (not shown), the current position of the first mobile device ME1 determined and corresponding first position information pme1 transmitted to the central device ZE via the wireless network WLAN.

By an evaluation of the first position information pme1 it is established with the aid of the information about the first geographical area GB1 stored in the memory SP and the assigned first access system Z1 that the first mobile device ME1 is located in the first geographical area GB1 in which the first access system Z1 is disposed via which access to the room R is possible.

Next, it is checked with the aid of the access routine ZR whether access to the room R can be allowed based on the transmitted first identification ID1. Since an assignment of the first identification ID1 to the room R is stored in the memory SP, access to the room R can be enabled. This is effected in that activation information ai is formed in the central device ZE and transmitted to the first access system Z1. This causes the first access system Z1 or, as the case may be, the door opener to be activated and the door opened to allow the authorized person access to the room R. In this way it is made possible for an authorized person to access a secure room R in a convenient and simple manner with the aid of the mobile device ME1 that he/she carries with him/her.

Access to a secure installation—a machine which may only be operated by authorized personnel, for example—can be controlled analogously to the method described in the foregoing. In this case the access service implemented by the access routine ZR is in turn activated by the authorized person with the aid of his/her assigned second mobile device ME2 and his/her second identification ID2 is transmitted to the central device ZE, provided the authorized person is located in the second geographical area GB2 to which the second access system Z2 is assigned.

The localization of the second mobile device ME2 is again initiated with the aid of the access routine ZR, with the current position of the second mobile device being determined, as in the localization of the first mobile device ME1, by the GPS function in the second mobile device ME2 and corresponding second position information pme2 being formed and transmitted to the central device ZE via the wireless network WLAN.

By an evaluation of the second position information pme2 it is established with the aid of the information about the second geographical area GB2 stored in the memory SP and the assigned second access system Z2 that the second mobile device ME2 is located in the second geographical area GB2 in which the second access system Z2 is disposed.

Next, it is checked with the aid of the access routine ZR whether access to the installation E can be allowed based on the transmitted second identification ID2. Since an assignment of the second identification ID2 to the installation E is stored in the memory SP, access to the installation E can be enabled. This is effected in that activation information ai is formed in the central device ZE and transmitted to the second access system Z2, as a result of which the second access system Z2 or, as the case may be, a locking device is activated and the authorized person is allowed to operate the installation E. The activation of a locking device can also consist in a lock implemented by programming means being released by the activation information ai. In this way it is made possible for an authorized person to access a secure installation E, a machine for example, in a convenient and simple manner with the aid of the mobile device ME2 that he/she carries with him/her.

If a mobile device ME is located in a geographical area GB with an assigned access system Z wherein it possesses no authorization to access the secure room R or secure installation E due to an invalid identification ID, the respective access system Z is not activated, i.e. the access remains barred. In this case the transmitted identification ID and the determined position of the respective mobile device ME are not consistent with the stored identification ID and the assigned access system Z of the respective room or installation.

In this case information indicating the barring, for example "not authorized to access this room or this equipment", is transmitted to the mobile device ME and visualized there, i.e. displayed to the unauthorized person. If it is established that access is authorized, information indicating that access is allowed, for example "door is open or equipment can be operated", can be transmitted to the mobile device and visualized there.

The components of the central device ZE can advantageously be implemented by a microprocessor system or a personal computer, wherein the access routine ZR and the localization device LE are advantageously embodied by programming and the memory SP is implemented by a memory associated with the microprocessor system or personal computer and formed of, for example, EPROMs.

The invention is not restricted to the exemplary embodiment, but can be used in all situations where secure access is provided conveniently and easily to the most diverse types of installation such as, for example, communications or IT equipment, buildings or parts of buildings, but also to secure or protected geographical areas, wherein it is necessary to adapt the mobile devices and the central device to wireless networks and access systems that are preferably present.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for controlling access to secure areas or installations via access systems by a central device storing information about positions of the access systems, comprising:
- transmitting a service request, including an identification, from a mobile device to the central device,
- receiving by a central device; and
- performing, by the central device after receiving the service request,
  - initiating localization of the mobile device to obtain a result indicating one of a geographical area and a geographical position of the mobile device from a radio cell in a radio-cell-oriented mobile network in which the mobile device is currently registered, or using network-internal positioning methods, or with the aid of a GPS function in the mobile device;
  - identifying an access system from among the access systems where the mobile device is located, based on the result of the localization of the mobile device and the positions of the access systems;
  - checking, based on the identification, whether the user of the mobile device is authorized to get access via the identified access system; and
  - enabling physical access to a secure area or installation by a user in possession of the mobile device, by making the identified access system unlocked, if said checking validates authorization.

2. The method as claimed in claim 1, further comprising transmitting, if checking validates authorization, activation information to the selected access system by which access to one of a localized secure area and a localized secure installation is effected.

3. The method as claimed in claim 1, wherein the nearest access system to the one of the localized secure area and the localized secure installation is implemented by one of an opening system, a locking device, a barrier system and an encryption device.

4. The method as claimed in claim 1, wherein the secure area is represented by a secure room or secure zones in a building or by secure geographical areas.

5. The method as claimed in claim 1, further comprising:
- transmitting information relating to said checking of the identification to the mobile device; and
- visualizing the information at the mobile device.

6. The method as claimed in claim 1, wherein the mobile device is assigned to at least one authorized person and the identification indicates the authorization to access the one of the localized secure area and the localized secure installation.

7. The method as claimed in claim 1, wherein the identification is at least one of a network address, a logical address, a service address and security information.

8. The method as claimed in claim 1, wherein said localization of said mobile device is made by
- requesting the mobile device to deliver information about its current position; and
- receiving the information from the mobile device.

9. A central device for controlling access to secure areas or installations via localized access systems, comprising:
- means for storing position information about positions of the access systems;
- means for receiving a service request, including an identification, from a mobile device;
- means for initiating a localization of the mobile device to obtain a result indicating one of a geographical area and a geographical position of the mobile device from a radio cell in a radio-cell-oriented mobile network in which the mobile device is currently registered, or using network-internal positioning methods, or with the aid of a GPS function in the mobile device;
- means for identifying an access system where the mobile device is located from among the access systems, based on the result of the localization of the mobile device and the position information of the access systems;
- means for checking, based on the identification, whether the user of the mobile device is authorized to get access via the identified access system; and
- means for enabling physical access to a secure area or installation by a user in possession of the mobile device, by making the identified access system unlocked, if the checking validates authorization.

10. The central device as claimed in claim 9, further comprising means for transmitting activation information, if the checking validates authorization, to the selected access system by which access to one of a localized secure area and a localized secure installation is effected.

11. The central device as claimed in claim 9, further comprising:
- means for receiving the localization of the mobile device, and
- means for including the localization of the mobile device in determining the area of the localized access system.

12. The central device as claimed in claim 9, wherein said means for indicating includes
- means for forming information representing the result of the checking; and
- means for transmitting the information to the mobile device.

13. The central device as claimed in claim 9, further comprising:
- means for initiating a localization of the mobile device by transmitting a request to the mobile device requesting the current position of the mobile device;
- means for receiving from the mobile device the current position of the mobile device.

* * * * *